(12) United States Patent
Fitzgerald et al.

(10) Patent No.: US 11,669,615 B2
(45) Date of Patent: Jun. 6, 2023

(54) SKEWNESS IN INDICATORS OF COMPROMISE

(71) Applicant: McAfee, LLC, San Jose, CA (US)

(72) Inventors: Niall Fitzgerald, County Cork (IE); Steven Grobman, Flower Mound, TX (US); Jonathan B. King, Hillsboro, OR (US); Sorcha Bairbre Healy, County Cork (IE); Gerard Donal Murphy, County Cork (IE)

(73) Assignee: McAfee, LLC, San Jose, CA (US)

(*) Notice: Subject to any disclaimer, the term of this patent is extended or adjusted under 35 U.S.C. 154(b) by 329 days.

(21) Appl. No.: 16/936,872

(22) Filed: Jul. 23, 2020

(65) Prior Publication Data
US 2022/0027463 A1    Jan. 27, 2022

(51) Int. Cl.
*G06F 21/55* (2013.01)
*G06F 16/23* (2019.01)
*G06F 16/245* (2019.01)

(52) U.S. Cl.
CPC ........ *G06F 21/552* (2013.01); *G06F 16/2365* (2019.01); *G06F 16/2379* (2019.01); *G06F 16/245* (2019.01); *G06F 2221/034* (2013.01)

(58) Field of Classification Search
CPC ...... G06F 21/55; G06F 21/552; G06F 21/554; G06F 21/56; G06F 21/566;
(Continued)

(56) References Cited

U.S. PATENT DOCUMENTS 10,284,601 B1 * 5/2019 Bar-Menachem ....... G07G 3/00
10,587,647 B1 * 3/2020 Khalid ................ H04L 63/1416
(Continued)

OTHER PUBLICATIONS

Goonatilake et al., Intrusion Detection Using The Chi-Square Goodness-Of-Fit Test For Information Assurance, [online], Oct. 2007 [retrieved on Aug. 18, 2022]. Retrieved from the Internet:< URL: https: //dl.acm.org /doi/ pdf/10.5555/ 1289280.1289329, pp. 255-263 (Year: 2007).*

(Continued)

*Primary Examiner* — Malcolm Cribbs
(74) *Attorney, Agent, or Firm* — Patent Capital Group

(57) ABSTRACT

There is disclosed in one example a computer-implemented method of detecting a statistically-significant security event and automating a response thereto, including: querying, or causing to be queried, a security intelligence database for sector-wise historical norms for an indicator of compromise (IoC); obtaining sector-wise expected prevalence data for the IoC; receiving observed sector-wise prevalence data for the IoC; computing a first test statistic from a goodness-of-fit test between the observed and expected prevalences; from the observed sector-wise prevalence data, computing a second test statistic from a difference between a highest prevalence and a next-highest prevalence; computing a third test statistic from a difference between the observed prevalence of a highest prevalence sector and the expected prevalence for the highest prevalence sector; selecting a least significant statistic from among the first, second, and third test statistics; and determining from the least significant statistic whether to notify a subscriber.

20 Claims, 12 Drawing Sheets

(58) Field of Classification Search
CPC ............... G06F 16/2379; G06F 16/245; G06F 16/2365; G06F 2221/034; H04L 63/14; H04L 63/1408; H04L 63/1416; H04L 63/1425; H04L 63/1433; H04L 63/1441
See application file for complete search history.

(56) References Cited

U.S. PATENT DOCUMENTS

| | | | |
|---|---|---|---|
| 2017/0187741 A1* | 6/2017 | Desch | H04L 63/102 |
| 2018/0191747 A1* | 7/2018 | Nachenberg | H04L 63/20 |
| 2020/0186569 A1* | 6/2020 | Milazzo | H04L 63/08 |
| 2020/0336497 A1* | 10/2020 | Seul | H04L 63/1433 |
| 2020/0366689 A1* | 11/2020 | Lotia | H04L 63/1458 |
| 2020/0382525 A1* | 12/2020 | Scheideler | G06F 11/327 |

OTHER PUBLICATIONS

Ye et al., An Anomaly Detection Technique Based on a Chi-Square Statistic for Detecting Intrusions into Information Systems. [online], Mar. 2001 [retrieved on Aug. 18, 2022]. Retrieved from the Internet:< URL: https: //onlinelibrary. wiley. com/doi /epdf/10.1002/ qre.392 (Year: 2001).*

* cited by examiner

SKEWNESS IN INDICATORS OF COMPROMISE

FIELD OF THE SPECIFICATION

This application relates in general to computer security, and more particularly though not exclusively to a system and method of detecting skewness in indicators of compromise.

BACKGROUND

Cybersecurity telemetry has many applications, including in predicting attacks and in performing postmortem analysis on detected attacks.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
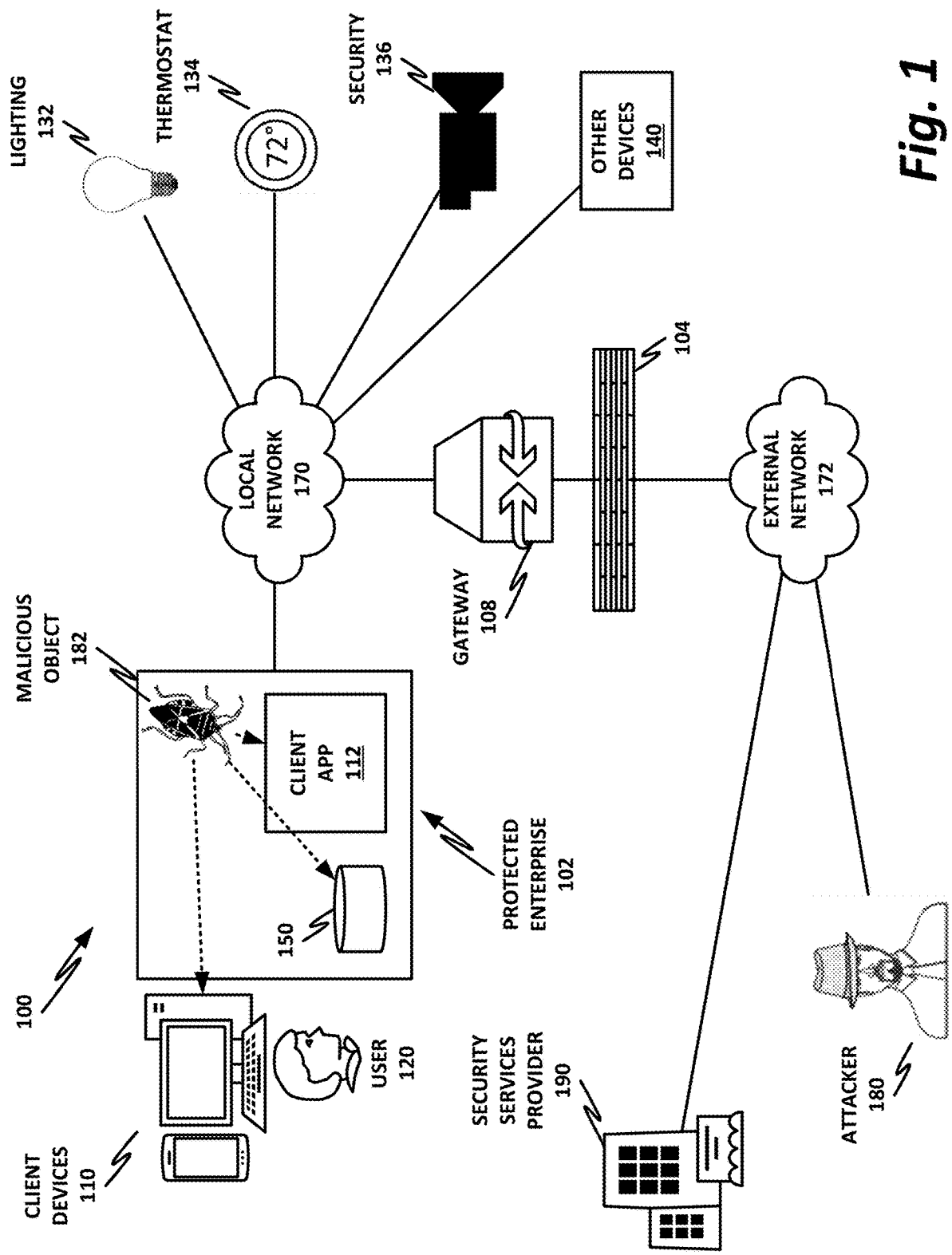
FIG. 1 is a block diagram of selected elements of a security ecosystem.

In an example, there is disclosed a computer-implemented method of detecting a statistically-significant security event and automating a response thereto, comprising: querying, or causing to be queried, a security intelligence database for sector-wise historical norms for an indicator of compromise (IoC); obtaining sector-wise expected prevalence data for the IoC; receiving observed sector-wise prevalence data for the IoC; computing a first test statistic from a goodness-of-fit test between the observed and expected prevalences; from the observed sector-wise prevalence data, computing a second test statistic from a difference between a highest prevalence and a next-highest prevalence; computing a third test statistic from a difference between the observed prevalence of a highest prevalence sector and the expected prevalence for the highest prevalence sector; selecting a least significant statistic from among the first, second, and third test statistics; and determining from the least significant statistic whether to notify a subscriber.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Cybersecurity telemetry can include large volumes of indicators of compromise (IoCs) that may track data across a range of threat vectors. Threat vectors could include, for example, a URL, an internet protocol (IP) address, a geographic location, an industry, an operating system, installed software, toolkits used, or other IoCs.

Threats may be widespread, and may indiscriminately hit individuals and organizations in the wild. Other types of threats may be more targeted, and may strike particularly at certain "sectors," including for example industrial sectors, geographic locations, regions, operating systems, user groups, ethnic groups, religious groups, enterprises, governments, or other organizations or groups. When a cybersecurity threat targets a particular group, this information may be of interest to other members of the group who have not yet been impacted or compromised. Those other individuals may wish to be aware of the threat and the associated IoCs, which may permit them to take remedial action, implement preventative measures, or otherwise protect themselves against the threat. Thus, it is beneficial to identify when there is a skew in certain IoCs that may indicate with statistical significance that a particular group is being targeted, and in particular, if that group is being targeted more than normal. For example, certain industries such as banking and e-commerce are frequently targeted by malware and attackers. Therefore, the fact that these groups are targeted does not in itself represent a statistical skew. However, if there is a statistically-significant change in the volume of attacks on these industries, that may indicate an area of concern. It is therefore advantageous to be able to calculate statistical skewness in given IoCs, so as to alert certain industries, regions, groups, governments, enterprises, or others.

The present specification provides a system and method for calculating skewness, which provides a mechanism to identify IoCs significantly prevalent for a particular sector or group from within a wider categorization. A "sector," as used throughout this specification and the appended claims, should be understood to include any subdivision or a larger class, as described above. For example, one sector from a range of industrial sectors may be targeted, one region from a range of geographic regions may be targeted, one government may be targeted, one religious, ethnic, or social group may be targeted from a larger group of religious, ethnic, or social groups, or similar. A system according to the present specification may be programmed to automatically identify a turning point at which a prevalence count becomes noteworthy, while considering group prevalence averages. This statistical turning point may be calculated according to a "skewness," which represents a statistical skew. In some embodiments of the present specification, a skew may be detected when the statistical p-value goes below a certain threshold. This statistical threshold or p-value threshold may be user-configurable, and may reflect the sensitivity of the particular industry or group.

For example, a protected enterprise in the banking industry may have a higher sensitivity to skewness than, for example, the pet care industry. The banking industry actor in this example may also have greater resources available to investigate potential attacks. Thus, the banking industry actor may set a more sensitive threshold than the pet care industry actor, and may receive alerts when the p-value exceeds a particular threshold. The banking industry actor can then commit resources to investigate potential events to determine whether the statistical skew represents an actual attack. On the other hand, the pet care industry actor may have fewer resources to commit to investigating potential attacks, and may set a less-sensitive p-value threshold. Nevertheless, if the p-value exceeds this less-sensitive threshold, the pet industry actor may also investigate, and determine whether an actual cybersecurity attack is underway.

Over time, the various actors may adjust their p-value thresholds in reaction to observed real-world phenomena. For example, if the banking industry actor finds that it is investigating a large number of false positives, it may wish to adjust the p-value sensitivity to be less sensitive. (On the other hand, if the stakes are high enough, the banking industry actor may be tolerant of a large number of false positives in exchange for a much lower probability of a false negative.) Similarly, if the pet care industry actor finds that it has missed a potential security threat, it may wish to adjust its sensitivity to capture more events, even if this means some small number of false positives.

An output of a system of the present specification may be delivered via a score value between 0 and 1 (e.g., a p-value). Advantageously, this score can be easily integrated into downstream processes and products. This provides a benefit of being relatively generic for applications across different threat vectors (e.g., file, URL, IP, and similar), count types (e.g., request, client, organization, and similar), and categorization type (industrial sector, region, country, or similar).

A system according to the present specification may realize advantages relative to a less sophisticated system that considers only group percentages of overall IoC total. In such a system, it may remain unclear at which point the IoC prevalence count is deemed noteworthy or statistically significant for a certain categorization.

Based on historical data, it is possible to estimate the expected distribution of IoC prevalence across particular groups. Based on this expected distribution, the system can then determine whether there is a deviation from a scaled expected profile, and whether this deviation is significantly different, considering a typical set of deviations. This approach may be augmented with a moving window, so that historical expectations are more focused on recent observations.

At a conceptual level, a system of the present specification may provide three queries:

1. Does the observed distribution across groups conform with the expected distribution, based on historical averages?

2. Is the group with the highest prevalence statistically significantly higher than the next-highest-prevalence group?

3. Is the group with the highest prevalence statistically significantly higher than is expected for that group?

These queries may be made for each IoC vector of counts, and a statistical p-value may be produced for each one. The maximum p-value of the three queries can then be taken as the representative score of skewness for that IoC.

Standard statistical practice includes, when analyzing count data, performing a goodness-of-fit test to establish if the distribution is significantly different from expected counts. In some existing systems, this may be followed by a plurality of post hoc tests to establish which groups are significantly different from each other. P-value adjustments may then be made to adjust for the multiple tests being performed.

Some embodiments of the present specification provide a method that is distinct from this existing approach by providing the three queries above. These three queries test whether the most prevalent group is significantly higher from the next most prevalent group. Furthermore, a system according to the present specification may perform a third nonstandard check to ensure that the most prevalent group is significantly higher than expected for that group. Finally, by taking the maximum of the three p-values, this system can ensure that the level of each component is at or greater than the skew metric in each case.

As discussed above, a starting point for many existing approaches is to take the group with the highest prevalence and use this as a measure of skewness. It is possible to use a static threshold and compare against that static threshold to quantify skewness. A limitation of this approach is that it does not take into account historical averages for any group, or the associated dynamic nature of the prevalence. This approach also does not detect when an indicator is significantly skewed. Advantageously, a system of the present specification can detect when an indicator is significantly skewed.

This provides the ability to identify the most and/or least-skewed items in a given group, based on count data. It also provides the ability to integrate into existing systems and software stacks. This enables alerting at a point at which an IoC becomes significantly skewed, which may be adjustable according to the desired sensitivity for a particular industry. This takes into account group norms, and ensures that only low scores occur when all three components have a low p-value. The scores are also standardized and comparable across different types of categorizations, such as industrial sectors and geographical skew scores. These can be scored on a comparable scale, providing the ability to identify whether an IoC was significantly skewed across a range of categorizations, even when those categorizations are not facially similar. In other words, the same scoring method could be used to detect attacks on a government, on a group, on a geographic location, on an industry sector, or on any other category.

A system and method for detecting skewness in indicators of compromise (IoCs) will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

In an example, protected enterprise 102 may subscribe to notifications from security services provider 190. For example, protected enterprise 102 could belong to an enterprise sector, a geographic location, a particular organization within any business group, or any other definable identity. Protected enterprise 102 may subscribe to notifications from security services provider 190 that relate to its identity. For example, protected enterprise 102 may wish to be notified if there appears to be an increase in malicious activity related to its business sector, business organization, enterprise type, geographic location, or some other identity. As discussed above, protected enterprise 102 may be able to provide a user-configurable threshold that is adapted to the sensitivity of the enterprise. For example, if protected enterprise 102 is a home user, that user may be less sensitive to potential attacks, and may be more sensitive to false positives. This is because the home user may not have the resources to investigate every potential attack. On the other hand, if protected enterprise 102 is a more sensitive organization, such as a bank or a government entity that deals in classified materials, the enterprise may have resources to investigate potential attacks, and may therefore be less sensitive to false positives. On the other hand, this same enterprise may be highly sensitive to false negatives, and may prefer to set a more sensitive threshold that allows it to investigate potential security events, even when they do not appear to be highly probable attacks.

The selection of this threshold may affect how quickly and effectively the enterprise can identify a threat. For example, a highly sensitive threshold may enable early detection by catching and investigating a relatively larger number of false positives, weeding out the false positives, and performing additional analysis to identify genuine attacks. This can be used to identify an attack before it becomes widespread or serious. On the other hand, a home user with fewer resources may rely more heavily on security services provider 190 to identify attacks, and may set a less-sensitive threshold, in which case the user is notified only when an attack is all but confirmed or at least substantially probable. In those cases, the home user may take additional precautions, such as encrypting or otherwise protecting data, or being more vigilant in security practices, which from the user's perspective may be preferable to expending resources investigating every potential but unconfirmed attack.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
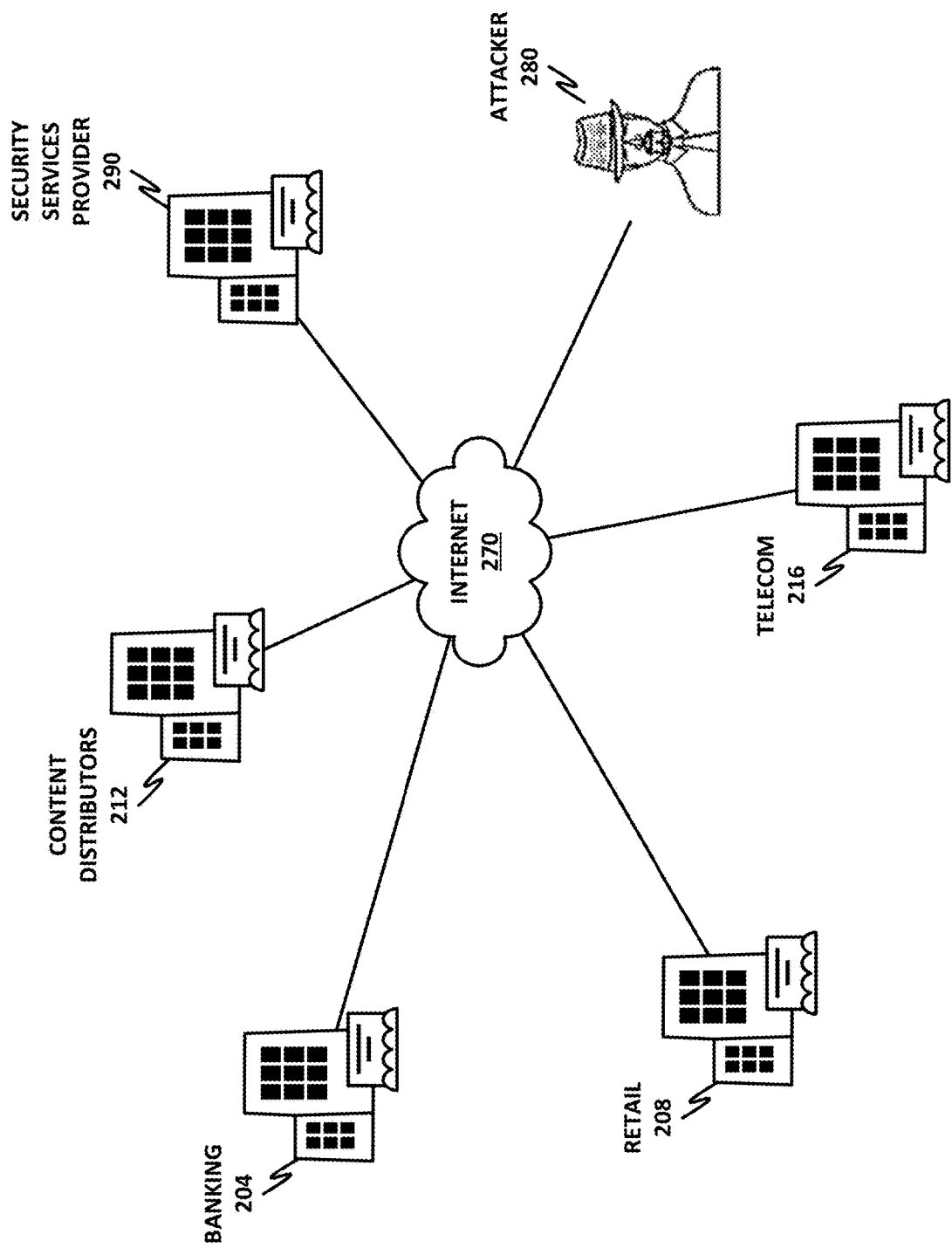
FIG. 2 is a block diagram of a multisector ecosystem.

FIG. 2 is a block diagram of a multisector ecosystem. In this example, enterprises or entities are divided by industry sector. Specifically illustrated are banking 204, retail 208, content distributors 212, and telecommunications 216, each connected to internet 270. These industry sectors are provided by way of illustrative and nonlimiting example only, and it should be recognized that many other industry sectors are possible. Furthermore, while this example illustrates the division of actors or entities by industry sector, it can be appreciated that other divisions are possible, such as geographic divisions, divisions between commercial and noncommercial enterprises, divisions between government and private actors, divisions between government sectors, business organizations within a business unit or enterprise, divisions between for-profit businesses and nonprofits such as charities and religious organizations, divisions between personal enterprises such as families and commercial enterprises, or other divisions.

In this example, one or more entities or enterprises within the various business sectors subscribe to notifications with security services provider 290. Client machines or devices within the enterprises or actors may monitor activity, and collect data that may be used as IoCs. These metadata may be uploaded to security services provider 290, and security services provider 290 may maintain a global database of IoCs or other threat intelligence information that can be used to monitor activity on a global basis. This global view of activity provides advantages to the various protected enterprises, because they have a more comprehensive view of the security ecosystem than an individual actor would have on its own.

Thus, an individual actor within the retail sector, for example, may not be well-positioned to recognize overall increased activity in the retail sector. The individual actor may be able to detect an increase of activity within its own enterprise, but cannot see activity within other enterprises of the same sector. Furthermore, even a global view of the sector as a whole may not detect changes in the relative volume of activity within the sector, relative to other sectors.

Therefore, it is advantageous to have a security services provider 290 that can aggregate activity both across the sector and between different sectors. This enables a global view of activity. Advantageously, the present specification provides a system and method that detects not only increased activity within a sector or other division, but that can also perform detection based on changes between various sectors or divisions. For example, suspected malicious activity or overall IoC counts could be divided as follows:
Content distributors: 17%
Banking: 37%
Retail: 21%
Telecom: 25%

These distributions may vary over time within a distribution that is considered ordinary or expected.

Thus, as new IoC data are collected, security services provider 290 may expect approximately 17% of the IoC counts to be directed at content distributors 212 (within, for example, a number of standard deviations), approximately 37% to be directed at banking, approximately 21% to be directed at retail, and approximately 25% to be directed at telecom. Note that these counts are provided as an illustrative example only, and these counts may be provided across a larger number of enterprises, and may have higher accuracy or precision.

As new IoC data are collected, security services provider 290 may determine that instead of the expected counts, telecom is now experiencing 38% of the activity. Retail is down to 17%, banking is down to 33%, and content distributors are down to 12%.

In this case, the variance for the retail sector may be within the expected range, and may not trigger an alert. However, the variances for banking, content distributors, and telecom may all appear to be statistically significant.

Furthermore, comparing the change in telecom (wherein the new value varies from the expected value by nearly two-thirds), this variance is much greater than the next most substantial variation, which was experienced by content distributors 212.

In the aggregate, these variations may indicate not only that something suspicious may be going on, but that most likely, that suspicious something is directed at the telecom industry.

Secured enterprises within the telecom industry that subscribe to services with security services provider 290 may then receive a notification that there appears to be increased activity directed at telecommunications. As described above, the individual actors may set their own thresholds for what they consider to be significant, and what is worth investigating. However, an increase in activity of nearly two-thirds may be significant even to a less-sensitive actor.

Enterprises within telecom sector 216 may then analyze IoCs or other data about the increased activity, and may be able to use that information to trace the activity back to attacker 280, which could be an individual attacker, a government, or some other person, entity, or group.

Figure 3:
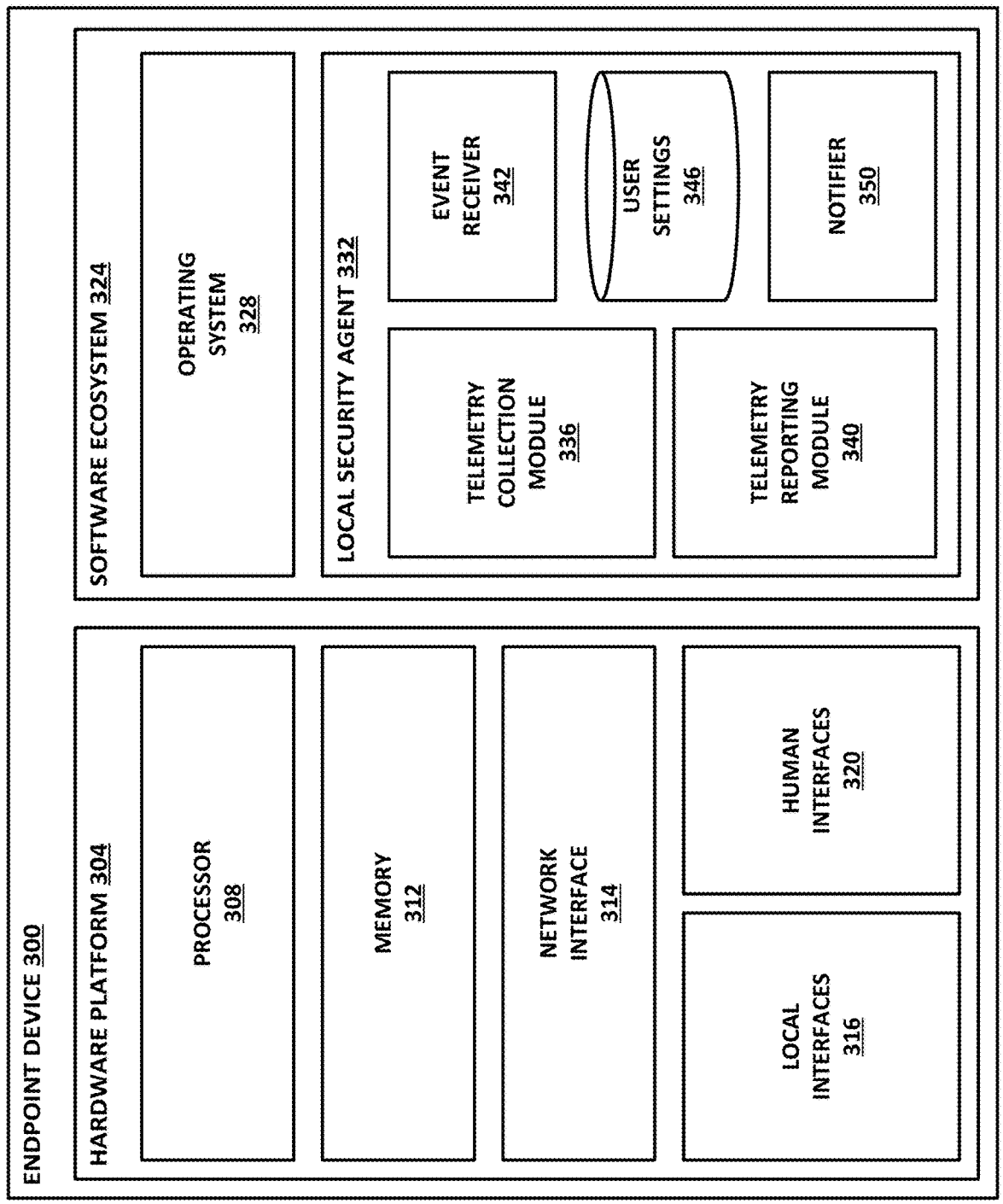
FIG. 3 is a block diagram of an endpoint device.

FIG. 3 is a block diagram of an endpoint device 300. Endpoint device 300 may be, for example, a desktop computer, a laptop computer, a tablet, a smart phone, a real-time system, a control system, an IoT device, or any other suitable device. Additional examples of architectures for such devices are illustrated in FIGS. 8-12 below.

In this example, endpoint device 300 is hosted on a hardware platform 304.

Hardware platform 304 includes, by way of illustrative and nonlimiting example, a processor 308, a memory 312 which may include both volatile and non-volatile memory (i.e., storage or other transitory or non-transitory computer-readable storage media), a network interface 314, local interfaces 316, and human interfaces 320.

When performing the methods of the present specification, processor 308 may retrieve from memory 312 instructions encoded on transitory or non-transitory computer-readable storage media, may optionally load those instructions into higher-speed memories or levels of memory, and may then iteratively execute the instructions to provide the method.

Network interface 314 may provide an interface to the external network, such as a wide area network (WAN) and/or local area network (LAN), and may provide network communications.

Local interfaces 316 may include interfaces for shorter range communication, such as Bluetooth, serial or parallel buses, infrared communication, radio frequency (RF) communication, or similar. For example, endpoint device 300 could be a smart chip or implanted medium that uses RF communication to communicate with a reader, and therefore may need to be secured against attacks. In cases where endpoint device 300 is an IoT device, it may have limited memory and processor functionality, and therefore may have less onboard security than a more sophisticated device may have.

Software ecosystem 324 may be hosted on hardware platform 304, such as by encoding instructions into a volatile or non-volatile memory that can be fetched and decoded by processor 308, or could be hosted remotely in various configurations, such as via a network share.

Software ecosystem 324 includes an operating system 328 that provides low-level functional operations for accessing hardware and performing other scheduled tasks.

Local security agent 332 may commonly run on operating system 328, and may reside in so-called "UserLand," or may operate with higher security privileges, such as root privileges or ring 0 privileges.

Local security agent 332 includes a telemetry collection module 336, a telemetry reporting module 340, an event receiver 342, user settings 346, and a notifier 350.

By way of illustrative example, telemetry collection module 336 may collect telemetry for local activity, which may include telemetry that may be converted into IoCs for analysis purposes.

Telemetry reporting module 340 may report telemetry back, for example, to a security services provider, where it can be aggregated with other telemetry to provide a global view of potential activity.

Event receiver 342 may be used to receive push notifications or other information about a potential event. These notifications may be published, for example, by a security services provider, and may then be processed by event receiver 342.

User settings 346 may include user preferences for local security agent 332, which could be individualized, or which could be set by the enterprise. Note that in the case where notifications are centralized, endpoint device 300 could be a server class device, and could collect event notifications from the security services provider for the entire enterprise, and may then determine based on user settings 346 which to push out to individual endpoint devices. Furthermore, some user settings 346 may be hosted on the security services provider's cloud infrastructure, for example, including a sensitivity threshold which ensures that the security services provider does not send out undesired notifications, because they are below the user's sensitivity threshold.

Notifier 350 may use information from event receiver 342 and user settings 346 to determine which events to send out to the human user or to the local enterprise, and how to handle those. Notifier 350 may also be programmed with rules for remedial action that may be taken responsive to a notification, such as initiating a self-healing process or isolating a particular network, subnetwork, machine, group of machines, class of machines, software package, class of software, or similar.

Figure 4:
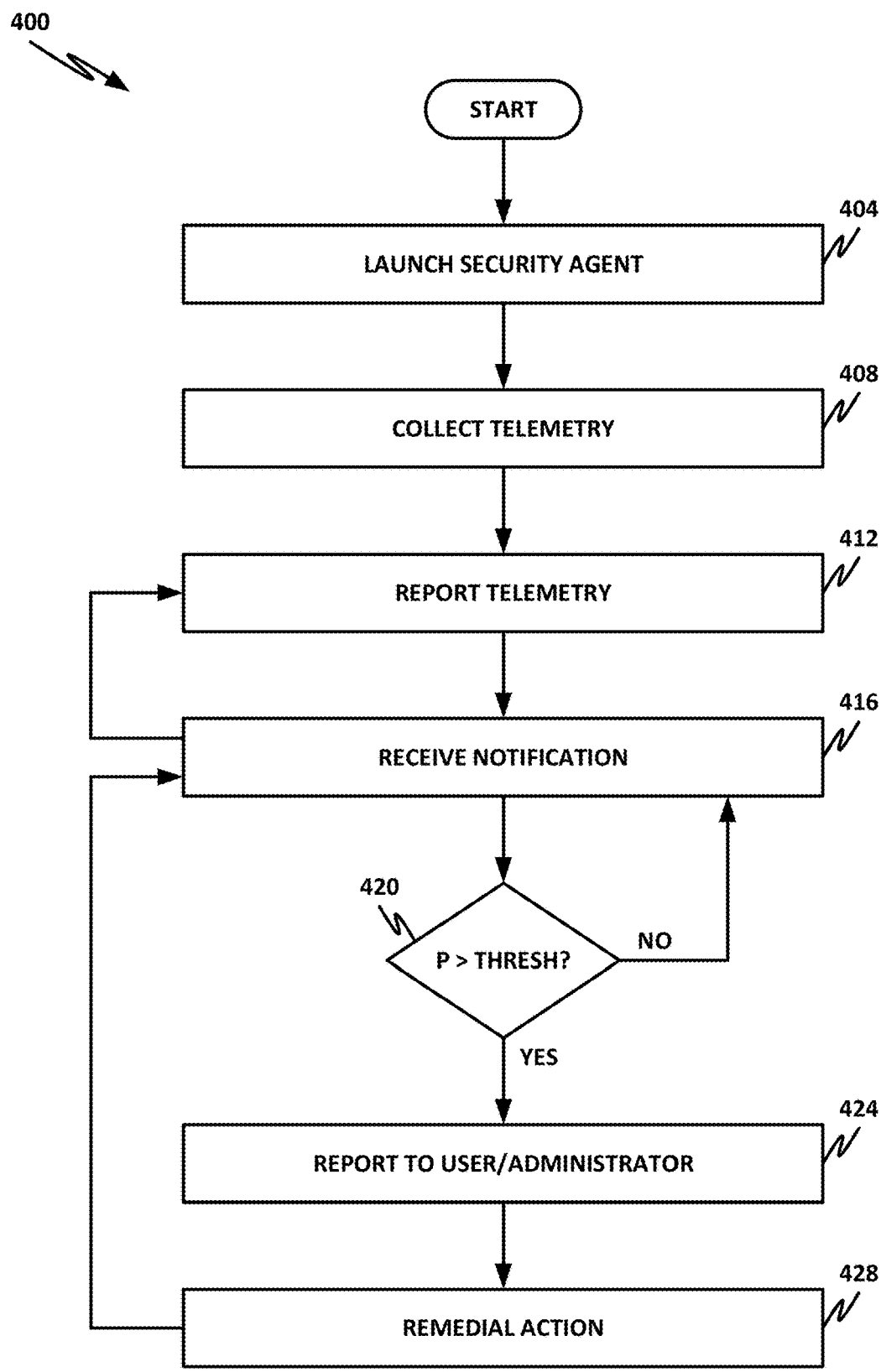
FIG. 4 is a flowchart of a method.

FIG. 4 is a flowchart of a method 400. In an illustrative embodiment, method 400 may be performed by an endpoint device, such as endpoint device 300 of FIG. 3.

Starting in block 404, the endpoint device may launch the security agent.

In block 408, the endpoint device periodically or on a trigger collects telemetry local to the device.

In block 412, the endpoint device reports the telemetry, such as to an enterprise server, or to a security services provider cloud.

In block 416, the endpoint device may receive a notification from the security services provider cloud service notifying of an event or a potential event. Note that this may occur in parallel with a continual telemetry reporting loop, wherein telemetry collection module 336 may continuously collect telemetry and telemetry reporting module 340 may continuously report telemetry.

Further in block 416, the endpoint device receives an event notification, such as at event receiver 342.

In block 420, event receiver 342 may check the incoming event against user settings 346, to determine whether it should be reported. For example, it may check whether the p-value is below a certain threshold. By way of illustrative example, the value $p \leq 0.05$ is generally considered statistically significant, indicating that the probability that the null hypotheses of equal distribution across sectors, equal distribution between highest and second-highest-ranking sectors, and expected distributions being true is very low (i.e., less than 5%). In this case, the statistical correlation may be between a change in IoC counts and a potential malicious activity. Thus, a value $p \leq 0.05$ indicates that there is strong evidence to suggest that a malware attack, or at least suspicious activity, is being directed at an enterprise sector, group, or other division. If the enterprise has set its sensitivity threshold at 0.05, then any value $p \leq 0.05$ will be greater than the designated threshold, and the event may be reported. Other thresholds may be set at other sensitivities. For example, a highly sensitive enterprise may set its p-value at 0.1, 0.2, or even 0.3, indicating that an event should be reported if there is a greater than 90% chance, 80% chance, or 70% chance, respectively, of malicious or suspicious activity. Because these thresholds may capture a large number of false negatives, a higher sensitivity may be used by an enterprise that is highly attractive as a target, and/or that has the resources to invest in investigating potential activity. Note that any threshold could be selected, depending on the actor's sensitivity.

On the other hand, an individual human or family actor may wish to have a much less-sensitive threshold, by setting a p-value at 0.04, 0.03, 0.02, or 0.01, indicating skewness across sectors of $\geq 96\%$, 97%, 98%, or 99%. These less-sensitive thresholds could be set by users or industries that have fewer resources to direct toward investigating false positives, and for industries that are less attractive as targets.

Thus, the textbook value of $\leq 0.05$ for statistical significance need not have any particular bearing on the teachings of the present specification. Individual users or industries can set their sensitivity thresholds based on the attractiveness of their targets, the hardness of their systems, and their ability to investigate and/or act on reports that may turn out to be false positives.

As an edge case, some industries may prefer to receive all statistical reports, regardless of the level of change, and to perform their own statistical analysis and make their own decisions about how to react. At the other extreme, individual users with little or no time or resources for investigating false positives, and who have on their computers or home networks only individual files that are of little interest to sophisticated attackers, may wish to be notified only after an attack has been essentially confirmed. These two edge cases correspond to sensitivity for $p<1.0$ and $p=0.0$, respectively.

In block 424, depending on the decision made, notifier 350 may notify an end user or a system administrator of the detected activity.

In block 428, the system may take some remedial action such as, for example, initiating a self-healing process or isolating a particular network, subnetwork, machine, group of machines, class of machines, software package, class of software, or similar, or by taking any other remedial action. Alternatively, a human user may react the notification by personally securing files or networks, being more vigilant, or taking other precautions.

Figure 5:
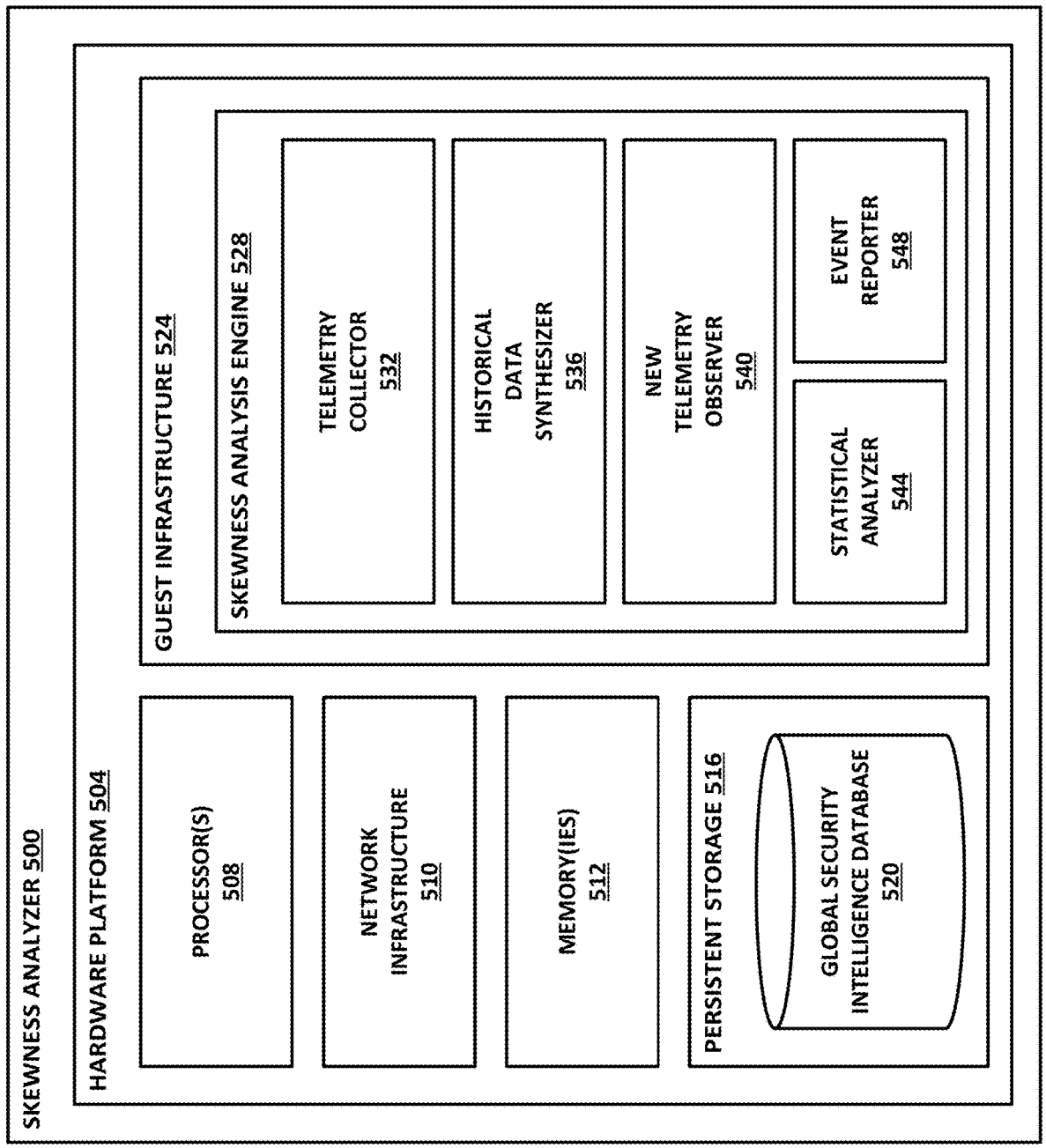
FIG. 5 is a block diagram of a skewness analyzer.

FIG. 5 is a block diagram of a skewness analyzer 500. Skewness analyzer 500 could be an individual workstation or a server, or it could be hosted on a cloud infrastructure. In an illustrative embodiment, skewness analyzer 500 is provided by a security services provider, although it could also be provided by an individual actor, sector, or enterprise to analyze raw data provided by a security services provider.

Skewness analyzer 500 provides the ability to detect the most and/or least-skewed items in a group, based on IoC count data. It can also provide alert data that can be integrated into other systems, as illustrated in FIG. 3 and elsewhere. These alerts may be provided at the point at which an IoC becomes significantly skewed, as determined by a sensitivity threshold, optionally set by the individual user or enterprise.

Advantageously, skewness analyzer 500 takes group norms into account to ensure that only low scores occur when all three components of the skewness analyzer have a low p-value. The score may also be standardized, and is comparable across different types of categorizations, including industrial sectors, geographical skew, or similar. Providing scores on a comparable scale provides the ability to identify if an IoC is significantly skewed for a categorization across a range of categories. In some cases, an individual actor may subscribe to different types of skewness notifications based on, for example, industry sector, geographical location, business organization, or some other division.

Figure 12:
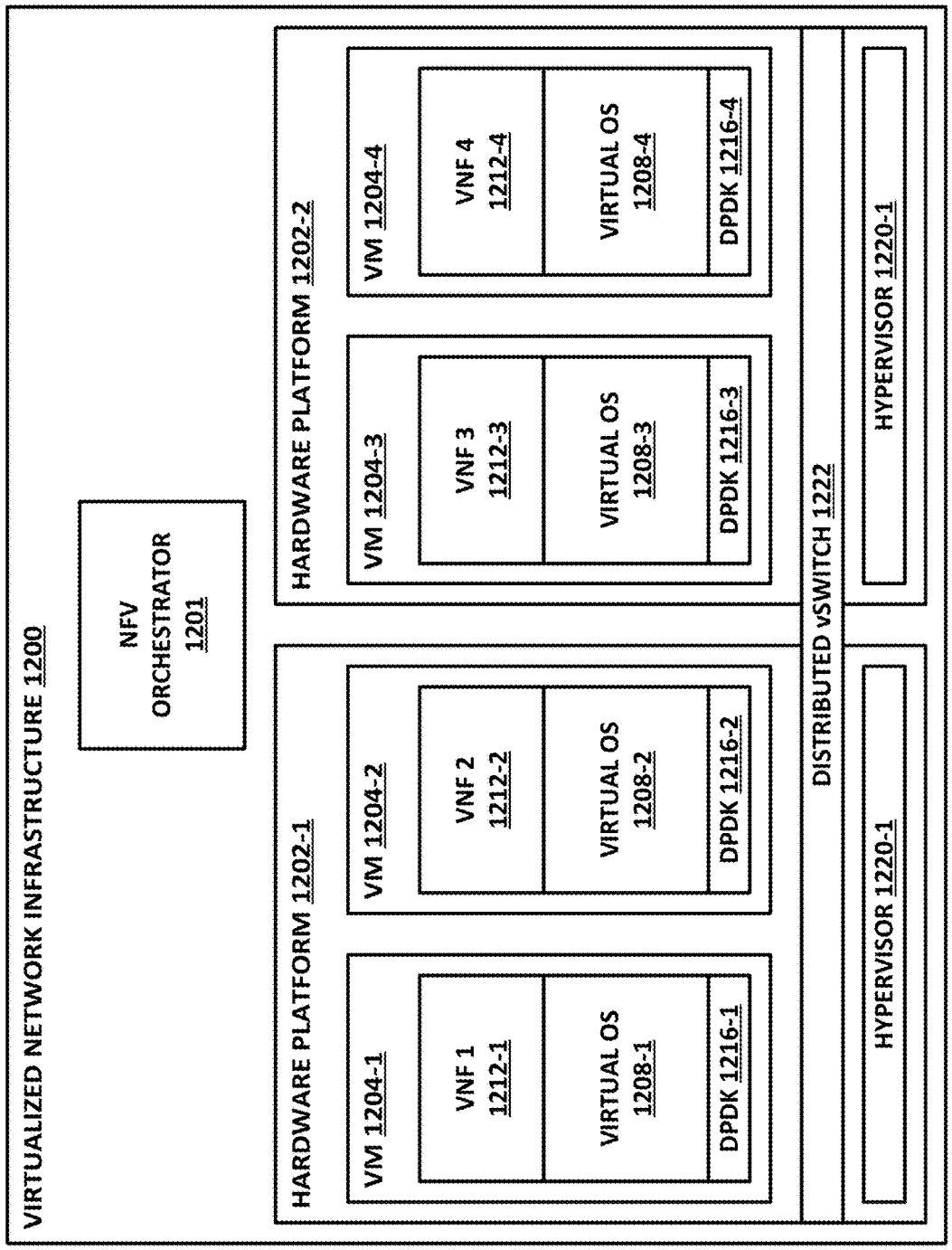
FIG. 12 is a block diagram of selected elements of a network function virtualization (NFV) infrastructure.

In this example, skewness analyzer 500 includes a hardware platform 504. Hardware platform 504 may include one or more processors 508, a network infrastructure 510, one or more memories 512, and one or more persistent storages 516. These could be provided on an individual server, or in a virtualized or containerized architecture. Examples of virtualization and containerization are illustrated in FIG. 12. Furthermore, hardware platform 504 may provide a trusted execution environment or similar, which can be used to secure data so that skewness analyzer 500 can cryptographically prove that the data being reported are, in fact, coming from the alleged reporter.

In this example, persistent storage 516 hosts a global security intelligence database 520. MCAFEE, LLC provides an example of such a database with its global threat intelligence (GTI™) architecture. However, any global security intelligence database could be used.

Global security intelligence database 520 may collect data across a broad range of industries, industry sectors, geographical locations, and other divisions to provide a global view of security activity or potential security activity. This can include collecting IoCs, and enumerating IoC counts for each division, to provide a historical norm for those particular divisions.

Hardware platform 504 may include a guest infrastructure 524, which could provide virtualization or containerization. This is an optional feature, and is often used in so-called cloud-based services.

Certain core functionalities of skewness analyzer 500 are provided by a skewness analysis engine 528.

Skewness analysis engine 528 includes a telemetry collector 532, which collects telemetry from individual actors, enterprises, endpoint devices, and from other data sources. Telemetry collector 532 may store collected data in global security intelligence database 520.

Historical data synthesizer 536 may perform statistical methods on the collected data to synthesize the historical norms used in the method. For example, in the illustration of FIG. 2, historical data synthesizer 536 may have determined as a starting point that content distributors 212 receive approximately 12% of counts for a particular IoC, banking sector 204 receives approximately 32% of counts for that IoC, retail 208 receives approximately 21% of counts for that IoC, and telecom receives approximately 35% of the counts for that IoC. These percentages form a historical norm that is the basis for some further analysis.

In block 540, a new telemetry observer observes new telemetry so that it can be compared against a particular historical norm. For example, historical data synthesizer 536 may operate on a sliding window, such as providing historical norms on a weekly basis, monthly basis, or annual basis. In some cases, in lieu of a periodic basis for calculating historical norms, historical norms may be reset when certain unusual activity occurs, such as a major attack on a particular sector. In this context, the term "sector" should be understood to refer to an industry sector, a geographical location, a business organization, a division between private or public enterprise, a division between for-profit enterprises and not-for-profit enterprises such as charities, churches, or others, or any other division. In this context, a sector may be any group of actors who may be of interest as targets for attack, and/or who may have a mutual interest in defending against such attacks. This mutual interest may be the motivation for them to mutually provide IoC count data for inclusion in a global security intelligence database 520, which can then be used to calculate expected historical norms.

New telemetry observer 540 may then calculate deviation from historical norms, for example, across a sliding window. By way of illustrative and nonlimiting example, IoC count data may be aggregated across a window such as one week, and then the historical norm may be calculated against a composite unit such as a month or a year. When new data come in, they may be aggregated on a basis such as hourly, daily, weekly, or on some other schedule or window. The new telemetry data may then be compared to the historical norms to determine, for example, whether the IoC count data for a particular sector have varied statistically significantly from the historical norms. In this case, statistical significance may be based on the preferred sensitivity for an individual actor and/or sector.

Once new telemetry has been collected and reported, statistical analyzer 544 may perform statistical methods on the data to determine whether there is a statistically-significant skew, according to the sensitivity preferences of the user, enterprise, and/or sector. An example of a statistical method is illustrated in flowchart 700 of FIG. 7.

After the statistical reports have been made, event reporter 548 may report out statistically-significant events based on preferred sensitivity thresholds to individual actors, industries, and/or other sectors. As described in connection with FIG. 3, the adjustment of sensitivity and whether and how much data to report may be dependent on the particular configuration. In some cases, all data are reported to particular actors or enterprises, and determinations of statistical significance may be made at the enterprise, while in other cases, those determinations may be made by the security services provider and data may be reported only when they meet the preferred sensitivity criteria of the actor, enterprise, and/or sector.

Figure 6:
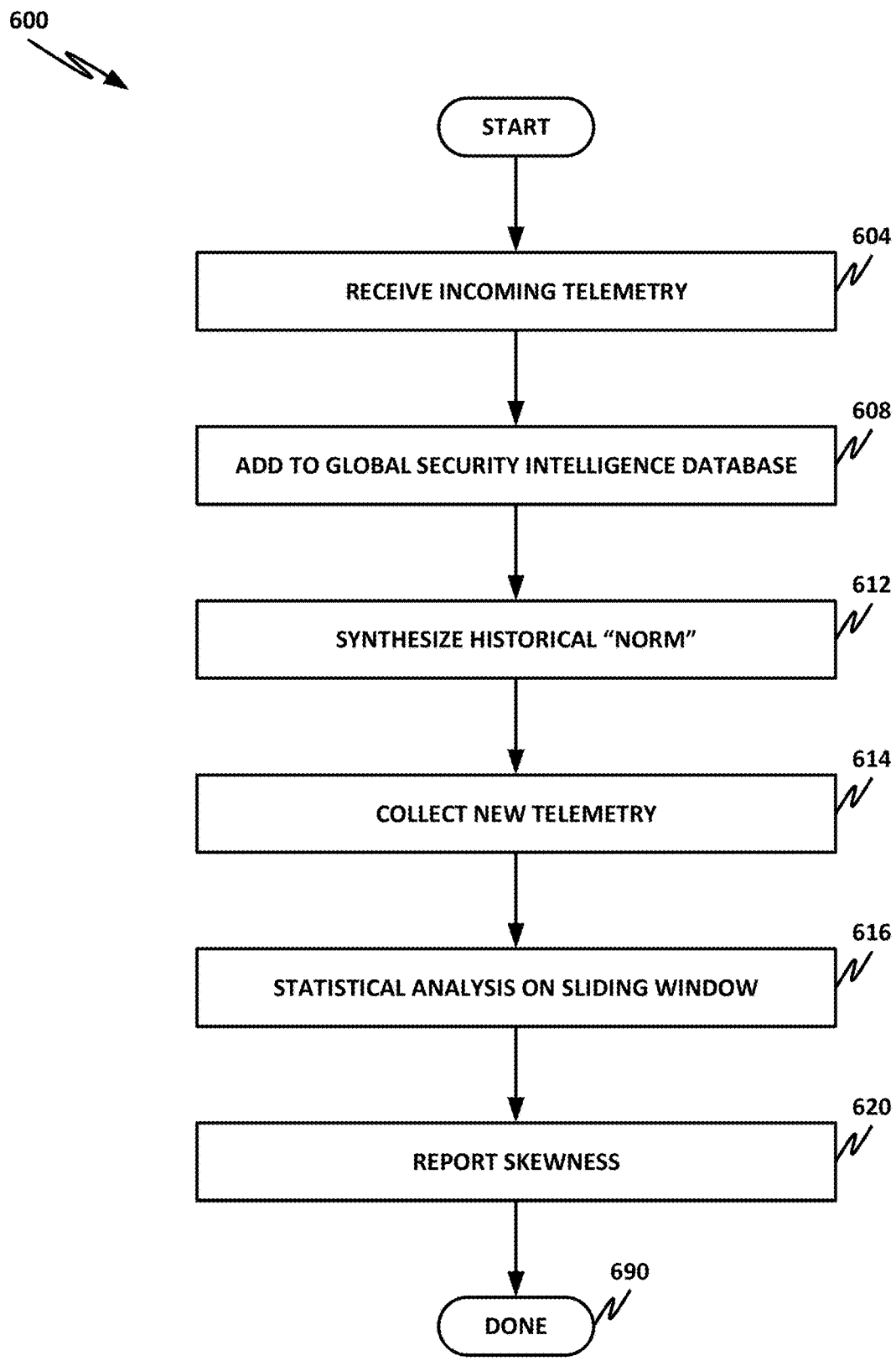
FIG. 6 is a flowchart of an additional method.

FIG. 6 is a flowchart of a method 600. Method 600 may be performed, for example, by skewness analyzer 500 of FIG. 5.

Starting in block 604, a module such as telemetry collector 532 receives incoming telemetry from endpoints, enterprises, or other data sources.

In block 608, telemetry collector 532 adds the collected information to a global security intelligence database, such as global intelligence security database 520.

In block 612, a historical data synthesizer such as historical data synthesizer 536 synthesizes the data into a historical norm, which may be based, for example, on a sliding window.

In block 614, new telemetry observer 540 collects new telemetry, which may be collected across the same or a different sliding window, as the demands of the particular embodiment require.

In block 616, statistical analyzer 544 performs statistical methods on the newly collected and historical data to determine whether there is a significant skew from the historical norm. An illustrative example of such a statistical method is provided in flowchart 700 of FIG. 7.

In block 620, event reporter 540 may report skewness as necessary or as desired, according to the preferred sensitivity of particular actors.

In block 690, the method is done.

Figure 7:
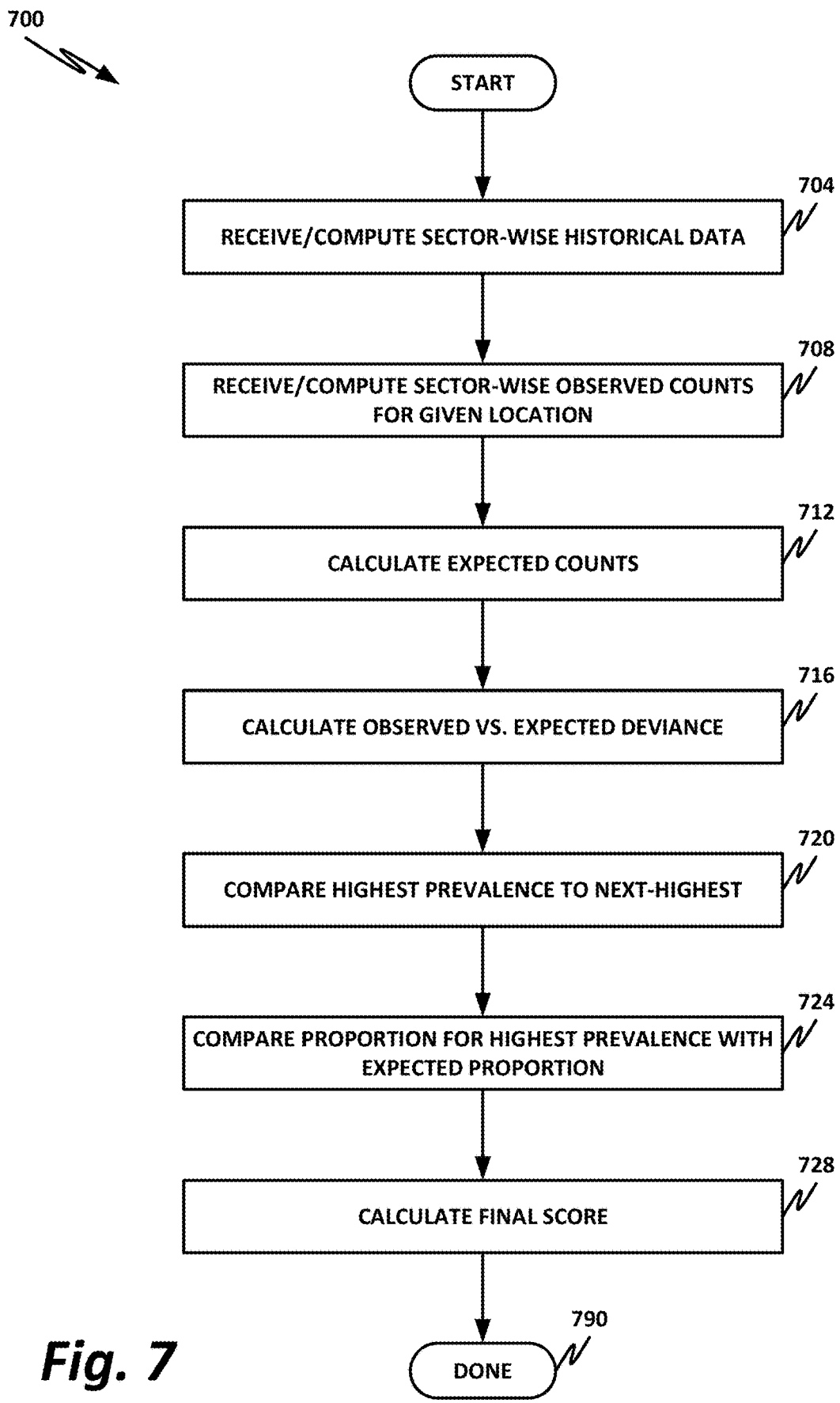
FIG. 7 is a flowchart of a further additional method.

FIG. 7 is a flowchart of a method that may be performed, for example, by statistical analyzer 544 of FIG. 5, or by some other device.

The approach disclosed herein is described in seven discrete steps that use theoretical IoC counts as an illustrative example. For the sake of simplicity, in this example, there are three categories or sectors being analyzed. By way of illustration, these are enterprise sectors, including technology, telecommunications, and government. Note that in this context, the term sector is used broadly as described above to include any division or group of actors that may be of interest in the security context of the present specification.

Throughout the description of method 700, the actions will be described in terms of a statistical analyzer, such as statistical analyzer 544 of FIG. 5. It should be noted that this method could be performed by this software module, or by any other suitable device, such as hardware, firmware, an application-specific integrated circuit, a field-programmable gate array (FPGA), or any other combination of hardware and/or software devices.

At operation 704, the statistical analyzer obtains the expected proportions for each sector. These expected proportions may be computed or estimated from historical data based, for example, on data stored within global security intelligence database 520. By way of illustrative example, the respective shares for the three illustrative sectors are as follows:

TABLE 1

Obtain Expected Proportions for Each Sector

|  | Technology | Telecoms | Government |
|---|---|---|---|
| Expected Proportion | 0.25 | 0.5 | 0.25 |

In block 708, the statistical analyzer obtains or computes sector-wise observed counts for a particular sector from a given field that represents an IoC. For example, in this illustration, the statistical analyzer counts 27 instances of the IoC within the technology sector, 65 within the telecom sector, and 8 within the government sector. This yields proportions of 0.25, 0.5, and 0.25, respectively, for the three sectors.

TABLE 2

Obtain Observed Counts from the Field for a Given IoC

|  | Technology | Telecoms | Government |
|---|---|---|---|
| Expected Proportion | 0.25 | 0.5 | 0.25 |
| Observed Counts | 27 | 65 | 8 |

In block 712, the statistical analyzer calculates the expected counts by combining the expected proportion and the observed counts.

For example, in the technology sector, the observed count is 27, while the expected count is 25. In the telecom sector, the observed count is 65 and the expected count is 50. In the government sector, the observed count is 8, and the expected count is 25.

In block 716, the statistical analyzer calculates the observed versus the expected deviance test statistic.

In an illustrative example, a chi-square goodness-of-fit test may be used to establish whether the distribution across sectors differs from the expectation for a given IoC:

$$\chi^2_{Nsectors} = \sum_{s=1}^{Nsectors} \frac{(O_s - E_s)^2}{E_s}$$

The result is a test statistic from which a p-value of 0.0003 is derived. This indicates a 99.97% probability of statistical significance.

In block 720, the statistical analyzer compares the highest prevalence to the next-highest-prevalence. It then tests whether the most prevalent sector has an observed prevalence proportion significantly higher than the next-highest sector, using the statistical test of two proportions:

$$Z = \frac{P_{r_1} - P_{r_2}}{\sqrt{p'(1-p')\left(\frac{1}{n_1} + \frac{1}{n_2}\right)}}$$

In this case, the most prevalent sector is telecom, and the next-highest sector is technology. The result is a test statistic from which a p-value of 0.00000007629 is derived. This test statistic indicates with an exceptionally high probability that there is statistical significance.

In block 724, the statistical analyzer compares the proportion for the highest prevalence group with the expected proportion for that group. It then tests whether the most prevalent sector has an observed prevalence proportion significantly higher than the expected proportion for that group, using a statistical test of two proportions. The same test is performed comparing the most prevalent sector to its expected count. In this case, the most prevalent sector is telecoms, so that is the sector that will be analyzed in this example:

$$Z = \frac{P_{r_1} - P_{r_2}}{\sqrt{p'(1-p')\left(\frac{1}{n_1} + \frac{1}{n_2}\right)}}$$

The result is a test statistic from which a p-value of 0.02261 is derived.

In block 728, a final score is calculated. In the previous operations, the following results have been obtained:

TABLE 3

| Results | |
|---|---|
| Block 716 | 0.0003 |
| Block 720 | .00000007629 |
| Block 724 | .02261 |

These three values can be combined by taking the maximum of the three values. In this case, the maximum of the three values is 0.02261. This yields a final skew score value of 0.02261 for the IoC in question.

Note that this same method can then be repeated for any and all IoCs for which count information is available, so that analysis can be performed across various sectors and across various IoCs in the various sectors.

By design, the score is a value between 0 and 1, with lower values indicating higher skewness. As described above, these values are statistical p-values, which indicate a probability of statistical significance. Further as described above, individual actors, enterprises, industries, and/or sectors may set their preferences for sensitivity. For example, if individual users wish to operate on the standard statistical p-value of 0.05, then they may be notified when there is ≥95% chance of statistical significance in the variation. In the example illustrated in FIG. 7, the final value is 0.02261, which is less than the standard statistical metric of p≤0.05, in which case this skewness is considered statistically significant, according to the user's preference. Specifically, there is approximately 98.7% probability of significance, which is greater than the user's expressed preference of 95% or greater. Other industries could use different sensitivity values.

At least some of the statistical methods described herein are known, and will be familiar to those with skill in the art of statistics. For example, the goodness-of-fit calculation and the two-proportions statistical test are each, in isolation, known statistical methods. However, the use of these statistical methods together in the disclosed method provide a novel and advantageous solution to the problem of detecting potentially significant IoC counts across different sectors. This provides the ability to automatically determine when a group or a sector is significantly skewed across categorizations. This can then be incorporated into automated monitoring systems and products. Embodiments of the present disclosure provide advantages over less sophisticated methods, such as simply using the maximum group prevalence for an IoC, or a pre-defined fixed percentage threshold of variation in IoCs to report skewness. Advantageously, the method disclosed herein results in fewer false positives, even for more highly sensitive sectors that desire to be notified in the case of "anything suspicious."

In block 790, the method is done.

Figure 8:
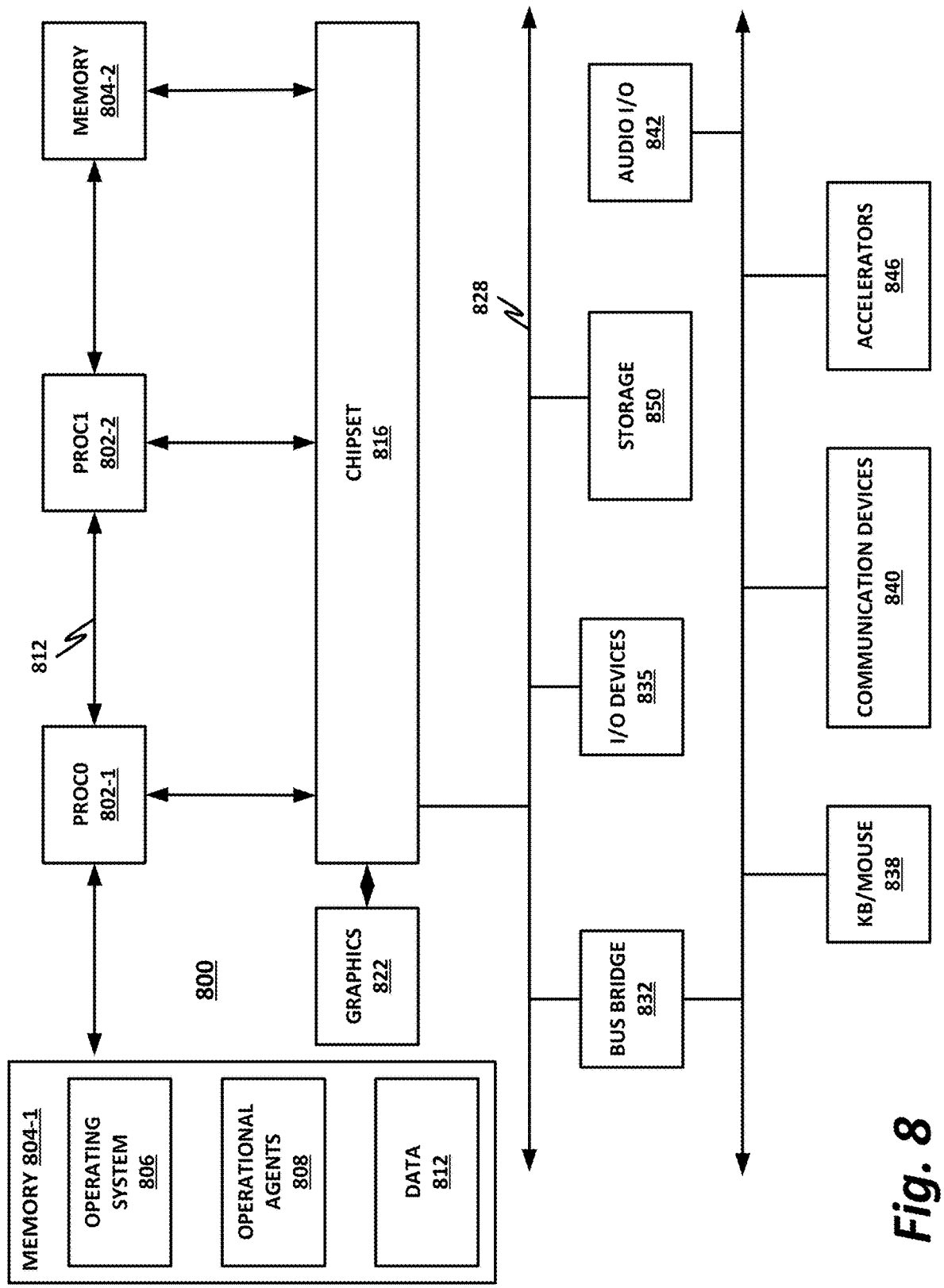
FIG. 8 is a block diagram of selected elements of a hardware platform.

FIG. 8 is a block diagram of a hardware platform 800. In at least some embodiments, hardware platform 800 may be configured or adapted to detect skewness in IoCs, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
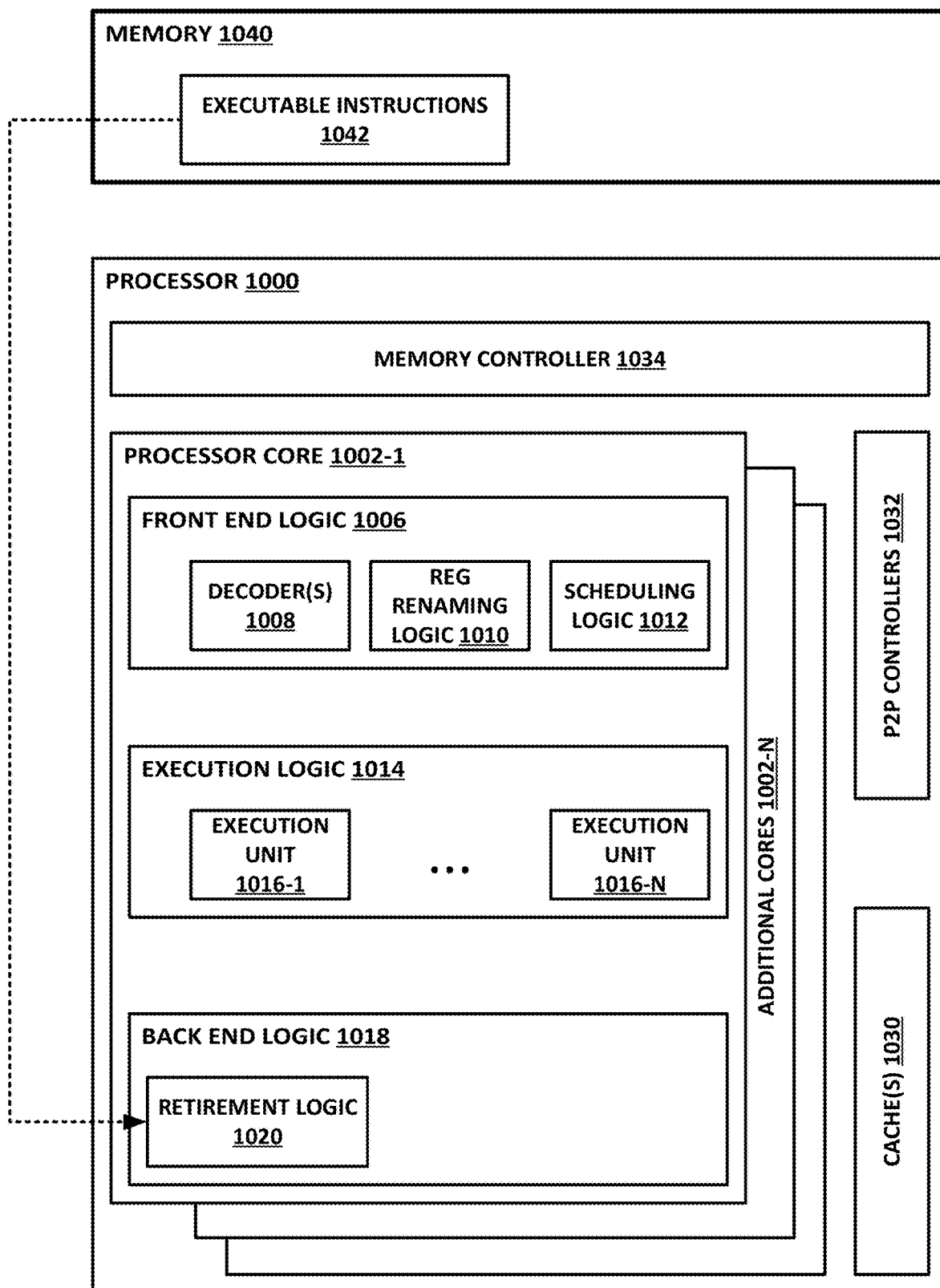
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high-performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPUs).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency non-volatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, an FPGA programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), WAN, wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, RF, or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
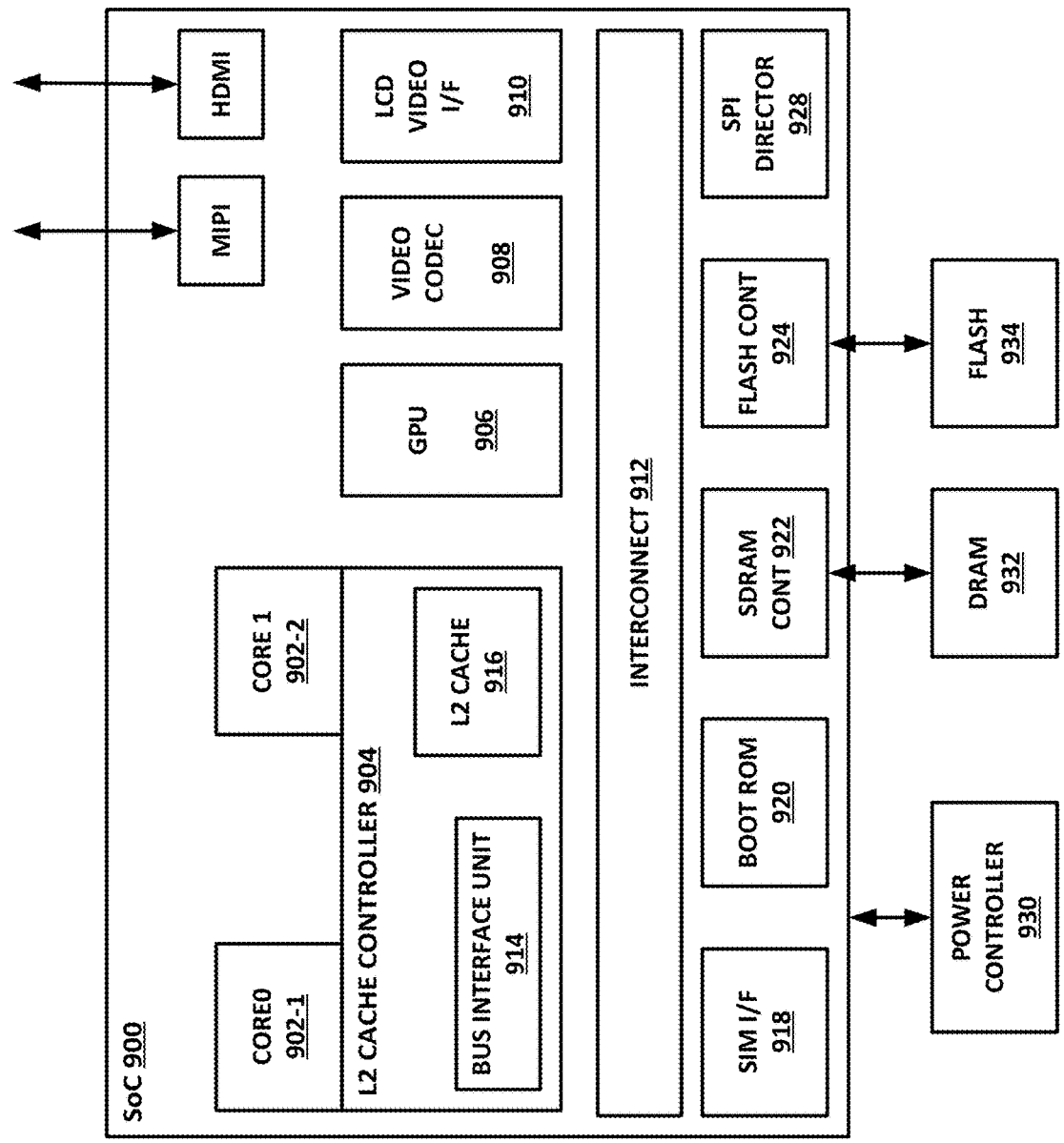
FIG. 9 is a block diagram of selected elements of a system-on-a-chip (SoC).

FIG. 9 is a block illustrating selected elements of an example system-on-a-chip (SoC) 900. In at least some embodiments, SoC 900 may be configured or adapted to detect skewness in IoCs, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) director 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be configured or adapted to detect skewness in IoCs, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VM)s are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
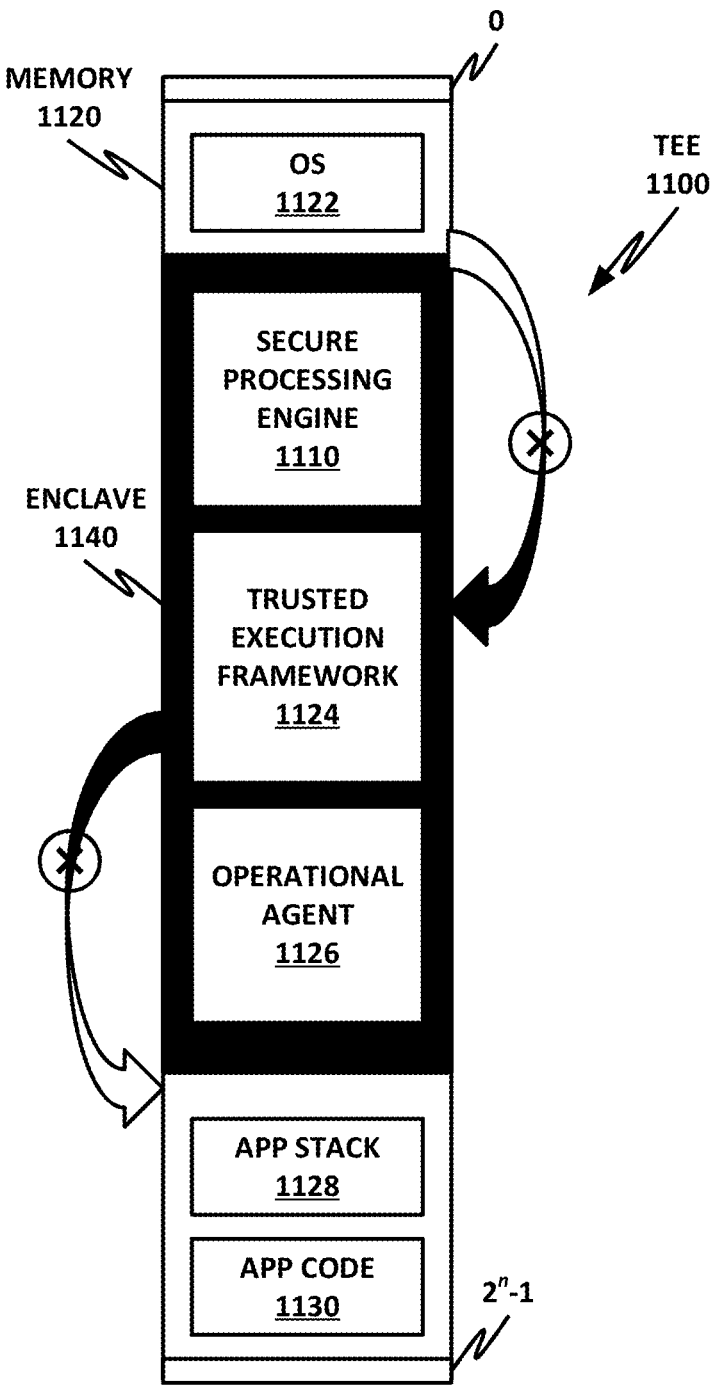
FIG. 11 is a block diagram of selected elements of a trusted execution environment (TEE).

FIG. 11 is a block diagram of a trusted execution environment (TEE) 1100. In some embodiments, historical and/or current telemetry data may be transferred securely and verified by the use of a TEE. This is useful in embodiments where the global security intelligence database is located on a device physically separate from the device performing statistical analysis.

In the example of FIG. 11, memory 1120 is addressable by n-bits, ranging in address from 0 to $2^n$-1 (note, however, that in many cases, the size of the address space may far exceed the actual memory available). Within memory 1120 is OS 1122, enclave 1140 (including secure processing engine 1110, trusted execution framework 1124, and operational agent 1126), application stack 1128, and application code 1130.

In this example, enclave 1140 is a specially-designated portion of memory 1120 that cannot be entered into or exited from except via special instructions, such as Intel Software Guard Extensions (SGX) or similar. Enclave 1140 is provided as an example of a secure environment which, in conjunction with a secure processing engine 1110, forms a TEE 1100 on a hardware platform such as platform 800 of FIG. 8. A TEE 1100 is a combination of hardware, software, and/or memory allocation that provides the ability to securely execute instructions without interference from outside processes, in a verifiable way. By way of example, TEE 1100 may include memory enclave 1140 or some other protected memory area, and a secure processing engine 1110, which includes hardware, software, and instructions for accessing and operating on enclave 1140. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1110 may be a user-mode application that operates via trusted execution framework 1124 within enclave 1140. TEE 1100 may also conceptually include processor instructions that secure processing engine 1110 and trusted execution framework 1124 require to operate within enclave 1140.

Secure processing engine 1110 and trusted execution framework 1124 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1122 may be excluded from TCB, in addition to the regular application stack 1128 and application code 1130.

In certain systems, computing devices equipped with Intel SGX or equivalent instructions may be capable of providing an enclave 1140. It should be noted, however, that many other examples of TEEs are available, and TEE 1100 is provided only as one example thereof. Other secure environments may include, by way of nonlimiting example, a virtual machine, sandbox, testbed, test machine, or other similar device or method for providing a TEE 1100.

In an example, enclave 1140 provides a protected memory area that cannot be accessed or manipulated by ordinary computer instructions. Enclave 1140 is described with particular reference to an Intel SGX enclave by way of example, but it is intended that enclave 1140 encompass any secure processing area with suitable properties, regardless of whether it is called an "enclave."

One feature of an enclave is that once an enclave region 1140 of memory 1120 is defined, as illustrated, a program pointer cannot enter or exit enclave 1140 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1140.

Thus, once enclave 1140 is defined in memory 804, a program executing within enclave 1140 may be safely verified to not operate outside of its bounds. This security feature means that secure processing engine 1110 is verifiably local to enclave 1140. Thus, when an untrusted packet provides its content to be rendered with trusted execution framework 1124 of enclave 1140, the result of the rendering is verified as secure.

Enclave 1140 may also digitally sign its output, which provides a verifiable means of ensuring that content has not been tampered with or modified since being rendered by secure processing engine 1110. A digital signature provided by enclave 1140 is unique to enclave 1140 and is unique to the hardware of the device hosting enclave 1140.

FIG. 12 is a block diagram of a network function virtualization (NFV) infrastructure 1200. In some embodiments, historical and/or current telemetry data may be transferred securely and verified by the use of an NFV infrastructure. This is useful in embodiments where the global security intelligence database is located on a device physically separate from the device performing statistical analysis.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1200. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 12, an NFV orchestrator 1201 manages a number of the VNFs 1212 running on an NFVI 1200. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1201 a valuable system resource. Note that NFV orchestrator 1201 may provide a browser-based or graphical configuration interface, and in some embodiments may be integrated with SDN orchestration functions.

Note that NFV orchestrator 1201 itself may be virtualized (rather than a special-purpose hardware appliance). NFV orchestrator 1201 may be integrated within an existing SDN system, wherein an operations support system (OSS) manages the SDN. This may interact with cloud resource management systems (e.g., OpenStack) to provide NFV orchestration. An NFVI 1200 may include the hardware, software, and other infrastructure to enable VNFs to run. This may include a hardware platform 1202 on which one or more VMs 1204 may run. For example, hardware platform 1202-1 in this example runs VMs 1204-1 and 1204-2. Hardware platform 1202-2 runs VMs 1204-3 and 1204-4. Each hardware platform may include a hypervisor 1220, virtual machine manager (VMM), or similar function, which may include and run on a native (bare metal) operating system, which may be minimal so as to consume very few resources.

Hardware platforms 1202 may be or comprise a rack or several racks of blade or slot servers (including, e.g., processors, memory, and storage), one or more data centers, other hardware resources distributed across one or more geographic locations, hardware switches, or network interfaces. An NFVI 1200 may also include the software architecture that enables hypervisors to run and be managed by NFV orchestrator 1201.

Running on NFVI 1200 are a number of VMs 1204, each of which in this example is a VNF providing a virtual service appliance. Each VM 1204 in this example includes an instance of the Data Plane Development Kit (DPDK), a virtual operating system 1208, and an application providing the VNF 1212.

Virtualized network functions could include, as nonlimiting and illustrative examples, firewalls, intrusion detection systems, load balancers, routers, session border controllers, DPI services, network address translation (NAT) modules, or call security association.

The illustration of FIG. 12 shows that a number of VNFs 1204 have been provisioned and exist within NFVI 1200. This FIGURE does not necessarily illustrate any relationship between the VNFs and the larger network, or the packet flows that NFVI 1200 may employ.

The illustrated DPDK instances 1216 provide a set of highly-optimized libraries for communicating across a virtual switch (vSwitch) 1222. Like VMs 1204, vSwitch 1222 is provisioned and allocated by a hypervisor 1220. The hypervisor uses a network interface to connect the hardware platform to the data center fabric (e.g., an HFI). This HFI may be shared by all VMs 1204 running on a hardware platform 1202. Thus, a vSwitch may be allocated to switch traffic between VMs 1204. The vSwitch may be a pure software vSwitch (e.g., a shared memory vSwitch), which may be optimized so that data are not moved between memory locations, but rather, the data may stay in one place, and pointers may be passed between VMs 1204 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1222 is illustrated, wherein vSwitch 1222 is shared between two or more physical hardware platforms 1202.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computer-implemented method of detecting a statistically-significant security event and automating a response thereto, comprising: querying, or causing to be queried, a security intelligence database for sector-wise historical norms for an indicator of compromise (IoC); obtaining sector-wise expected prevalence data for the IoC; receiving observed sector-wise prevalence data for the IoC; computing a first test statistic from a goodness-of-fit test between the observed and expected prevalences; from the observed sector-wise prevalence data, computing a second test statistic from a difference between a highest prevalence and a next-highest prevalence; computing a third test statistic from a difference between the observed prevalence of a highest prevalence sector and the expected prevalence for the highest prevalence sector; selecting a least significant statistic from among the first, second, and third test statistics; and determining from the least significant statistic whether to notify a subscriber.

There is further disclosed an example method, wherein the sector-wise historical norms are derived from a sliding historical window.

There is further disclosed an example method, wherein the sliding historical window is biased toward recent historical data.

There is further disclosed an example method, wherein the observed sector-wise prevalence data are selected from a sliding window of recent short-term data.

There is further disclosed an example method, wherein the first, second, and third test statistics comprise statistical p-values.

There is further disclosed an example method, wherein the goodness-of-fit test is a chi-square test.

There is further disclosed an example method, wherein at least one of the second and third test statistics is computed as a statistical test of two proportions.

There is further disclosed an example method, wherein determining whether to notify the subscriber comprises determining whether the least significant statistic is statistically significant.

There is further disclosed an example method, further comprising receiving a user-selected criterion from the subscriber, and notifying the subscriber only if the least significant statistic meets the user-selected criterion.

There is further disclosed an example method, wherein the user-selected criterion comprises a maximum p-value threshold There is further disclosed an example method, wherein the user-selected criterion comprises a minimum statistical significance.

There is further disclosed an example method, further comprising initiating a self-healing process.

There is further disclosed an example method, further comprising initiating an investigation of the IoC.

There is further disclosed an example method, further comprising sending electronic instructions to automatically elevate security for devices or users affected by the IoC.

There is further disclosed an example method, further comprising automatically quarantining users or devices affected by the IoC.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed a skewness analyzer, comprising: a hardware platform; and a skewness analysis engine to execute on the hardware platform, and configured to: receive historical prevalences for an indicator of compromise (IoC)

across a plurality of sectors; receive observed prevalences for the IoC across the sectors; calculate a composite goodness-of-fit between the historical prevalences and observed prevalences to provide a first p-value; from the observed prevalences, calculate a two-proportions statistic between a highest prevalence sector and a next-highest-prevalence sector to provide a second p-value; compute a two-proportions statistic between the observed prevalence and an expected prevalence, based on the historical prevalence data, for the highest prevalence sector to provide a third p-value; select a final p-value being the least significant of the three provided p-values; query a subscriber database for a subscriber identifier and notification criterion; and if the final p-value meets the notification criterion, notify the subscriber of a security event associated with the final p-value.

There is further disclosed an example skewness analyzer, wherein the historical prevalences are derived from a sliding historical window.

There is further disclosed an example skewness analyzer, wherein the sliding historical window is biased toward recent historical data.

There is further disclosed an example skewness analyzer, wherein the observed prevalences are selected from a sliding window of recent short-term data.

There is further disclosed an example skewness analyzer, wherein calculating a composite goodness-of-fit further comprises applying a chi-square test.

There is further disclosed an example skewness analyzer, wherein at least one of the second and third p-values is computed as a statistical test of two proportions.

There is further disclosed an example skewness analyzer, wherein notifying the subscriber comprises determining whether the least significant p-value is statistically significant.

There is further disclosed an example skewness analyzer, wherein the notification criterion is a user-selected maximum p-value threshold.

There is further disclosed an example skewness analyzer, wherein the skewness analysis engine is further to initiate a self-healing process.

There is further disclosed an example skewness analyzer, wherein the skewness analysis engine is further to initiate an investigation of the IoC.

There is further disclosed an example skewness analyzer, wherein the skewness analysis engine is further to send electronic instructions to automatically elevate security for devices or users affected by the IoC.

There is further disclosed an example skewness analyzer, wherein the skewness analysis engine is further to automatically quarantine users or devices affected by the IoC.

There is also disclosed an example of one or more tangible, non-transitory computer-readable media having stored thereon executable instructions to: query a database for historical prevalence data for a plurality of sectors and an indicator of compromise (IoC); receive updated prevalence for the plurality of sectors and the IoC; compute expected prevalences for the plurality of sectors and the IoC; compute a plurality of statistical p-values from the historical prevalences, the current prevalences, and the expected prevalences, the plurality of statistical p-values including at least a goodness-of-fit and a two-proportions test; select a largest magnitude p-value from the plurality of statistical p-values; and perform a network security action according to the largest magnitude p-value.

There is further disclosed an example of one or more tangible, non-transitory computer-readable media, wherein the instructions are further to derive sector-wise historical norms from a sliding historical window.

There is further disclosed an example of one or more tangible, non-transitory computer-readable media, wherein the sliding historical window is biased toward recent historical data.

There is further disclosed an example of one or more tangible, non-transitory computer-readable media, wherein the instructions are further to select observed sector-wise prevalence data from a sliding window of recent short-term data.

There is further disclosed an example of one or more tangible, non-transitory computer-readable media, wherein the instructions are further to apply a chi-square analysis to test a difference between the expected prevalences and the observed prevalences to derive a goodness-of-fit.

There is further disclosed an example of one or more tangible, non-transitory computer-readable media, wherein the instructions are further to determine whether to notify a subscriber, further comprising determining whether the largest magnitude p-value is statistically significant.

There is further disclosed an example of one or more tangible, non-transitory computer-readable media, wherein the instructions are further to receive a user-selected criterion from a subscriber, and to notify the subscriber only if the largest magnitude p-value meets the user-selected criterion.

There is further disclosed an example of one or more tangible, non-transitory computer-readable media, wherein the user-selected criterion comprises a maximum p-value threshold.

There is further disclosed an example of one or more tangible, non-transitory computer-readable media, wherein the instructions are further to initiate a self-healing process.

There is further disclosed an example of one or more tangible, non-transitory computer-readable media, wherein the instructions are further to initiate an investigation of the IoC.

There is further disclosed an example of one or more tangible, non-transitory computer-readable media, wherein the instructions are further to send electronic instructions to automatically elevate security for devices or users affected by the IoC.

There is further disclosed an example of one or more tangible, non-transitory computer-readable media, wherein the instructions are further to automatically quarantine users or devices affected by the IoC.

What is claimed is:

1. A computer-implemented method of detecting a statistically-significant security event and automating a response thereto, comprising:
   querying, or causing to be queried, a security intelligence database for sector-wise historical norms for an indicator of compromise (IoC);
   obtaining sector-wise expected prevalence data for the IoC;
   receiving observed sector-wise prevalence data for the IoC;
   computing a first test statistic from a goodness-of-fit test between the observed and expected prevalence data;
   from the observed sector-wise prevalence data, computing a second test statistic from a difference between a highest prevalence and a next-highest prevalence;
   computing a third test statistic from a difference between the observed prevalence data of a highest prevalence sector and the expected prevalence data for the highest prevalence sector;

selecting a least significant statistic from among the first, second, and third test statistics;

determining from the least significant statistic whether to notify a subscriber; and taking a security action responsive to the determining.

2. The computer-implemented method of claim 1, further comprising receiving a user-selected criterion from the subscriber, and notifying the subscriber only if the least significant statistic meets the user-selected criterion.

3. The computer-implemented method of claim 2, wherein the user-selected criterion comprises a maximum p-value threshold.

4. The computer-implemented method of claim 2, wherein the user-selected criterion comprises a minimum statistical significance.

5. The computer-implemented method of claim 1, wherein sector-wise prevalence data are computed on a sector type, the sector type selected from the group consisting of industry, geographic, enterprise or business type, profit model, government-or-private, internal business unit, religious group, ethnic group, operating system, and user groups.

6. A skewness analyzer, comprising:

a hardware platform; and a skewness analysis engine to execute on the hardware platform, and configured to:

receive historical prevalences for an indicator of compromise (IoC) across a plurality of sectors;

receive observed prevalences for the IoC across the sectors;

calculate a composite goodness-of-fit between the historical prevalences and observed prevalences to provide a first p-value;

from the observed prevalences, calculate a two-proportions statistic between a highest prevalence sector and a next-highest-prevalence sector to provide a second p-value;

compute a two-proportions statistic between the observed prevalence and an expected prevalence, based on the historical prevalences, for the highest prevalence sector to provide a third p-value;

select a final p-value being the least significant of the three provided p-values;

query a subscriber database for a subscriber identifier and notification criterion; and if the final p-value meets the notification criterion, notify a subscriber of a security event associated with the final p-value, and instruct the subscriber to take a security action.

7. The skewness analyzer of claim 6, wherein the historical prevalences are derived from a sliding historical window.

8. The skewness analyzer of claim 7, wherein the sliding historical window is biased toward recent historical data.

9. The skewness analyzer of claim 6, wherein the observed prevalences are selected from a sliding window of recent short-term data.

10. The skewness analyzer of claim 6, wherein calculating a composite goodness-of-fit further comprises applying a chi-square test.

11. The skewness analyzer of claim 6, wherein at least one of the second and third p-values is computed as a statistical test of two proportions.

12. The skewness analyzer of claim 6, wherein notifying the subscriber comprises determining whether the least significant p-value is statistically significant.

13. The skewness analyzer of claim 6, wherein the notification criterion is a user-selected maximum p-value threshold.

14. The skewness analyzer of claim 6, wherein the skewness analysis engine is further to initiate a self-healing process.

15. The skewness analyzer of claim 6, wherein the skewness analysis engine is further to initiate an investigation of the IoC.

16. The skewness analyzer of claim 6, wherein the skewness analysis engine is further to send electronic instructions to automatically elevate security for devices or users affected by the IoC.

17. The skewness analyzer of claim 6, wherein the skewness analysis engine is further to automatically quarantine users or devices affected by the IoC.

18. One or more tangible, non-transitory computer-readable media having stored thereon executable instructions to:

query a database for historical prevalences for a plurality of sectors and an indicator of compromise (IoC);

receive updated prevalences for the plurality of sectors and the IoC;

compute expected prevalences for the plurality of sectors and the IoC;

compute a plurality of statistical p-values from the historical prevalences, the updated prevalences, and the expected prevalences, the plurality of statistical p-values including at least a goodness-of-fit and a two-proportions test;

select a largest magnitude p-value from the plurality of statistical p-values; and perform a network security action according to the largest magnitude p-value.

19. The one or more tangible, non-transitory computer-readable media of claim 18, wherein the instructions are further to apply a chi-square analysis to test a difference between the expected prevalences and observed prevalences to derive a goodness-of-fit.

20. The one or more tangible, non-transitory computer-readable media of claim 18, wherein the instructions are further to determine whether to notify a subscriber, further comprising determining whether the largest magnitude p-value is statistically significant.

* * * * *

UNITED STATES PATENT AND TRADEMARK OFFICE
CERTIFICATE OF CORRECTION

| | | |
|---|---|---|
| PATENT NO. | : 11,669,615 B2 | Page 1 of 1 |
| APPLICATION NO. | : 16/936872 | |
| DATED | : June 6, 2023 | |
| INVENTOR(S) | : Fitzgerald et al. | |

It is certified that error appears in the above-identified patent and that said Letters Patent is hereby corrected as shown below:

In the Claims

In Column 33, Claim 8, Line 53, delete "toward" and insert --towards--, therefor.

Signed and Sealed this
Twenty-fifth Day of July, 2023

Katherine Kelly Vidal
*Director of the United States Patent and Trademark Office*